US012425101B2

(12) United States Patent
Ishizaki et al.

(10) Patent No.: US 12,425,101 B2
(45) Date of Patent: Sep. 23, 2025

(54) ROBOT

(71) Applicant: Honda Motor Co., Ltd., Tokyo (JP)

(72) Inventors: Ryusuke Ishizaki, Saitama (JP); Tetsuro Tanazawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 309 days.

(21) Appl. No.: 18/169,817

(22) Filed: Feb. 15, 2023

(65) Prior Publication Data

US 2023/0283368 A1 Sep. 7, 2023

(30) Foreign Application Priority Data

Mar. 1, 2022 (JP) ................. 2022-031195

(51) Int. Cl.
*H04B 10/07* (2013.01)
*B25J 9/10* (2006.01)
(Continued)

(52) U.S. Cl.
CPC .......... *H04B 10/0795* (2013.01); *B25J 9/106* (2013.01); *B25J 9/1697* (2013.01); *G06N 3/008* (2013.01)

(58) Field of Classification Search
CPC .............. H04B 10/25755; H04B 10/40; H04B 10/801; H04B 10/035; H04B 10/077; H04B 10/0791; H04B 10/0795; H04B 10/07955; H04B 10/275; H04B 10/278; H04B 1/525; H04B 10/07953; H04B 17/336; H04B 17/0085; H04B 1/10; H04B 1/1027; H04B 10/25; H04B 17/318; H04B 1/385; H04B 2001/3866; H04B 10/07; H04B 10/071;
(Continued)

(56) References Cited

U.S. PATENT DOCUMENTS 4,941,206 A 7/1990 Sakurai et al.
2017/0309169 A1* 10/2017 Ishizaki ............... H04B 10/801
(Continued)

FOREIGN PATENT DOCUMENTS

CN 112491467 A * 3/2021 ......... G01C 21/3407
CN 112621778 A * 4/2021
(Continued)

OTHER PUBLICATIONS

"Office Action of Japan Counterpart Application", issued on Jul. 8, 2025, with English translation thereof, p. 1-p. 10.

Primary Examiner — Michael P Stafira
(74) Attorney, Agent, or Firm — JCIPRNET

(57) ABSTRACT

A robot includes: links, connected in series to a base via joints; actuators, driving the joints to relatively displace a corresponding pair of links connected to each other; control devices, distributedly arranged in the base and the links and controlling the actuators; a communication cable, comprising an optical fiber connecting the control devices to each other and transmitting information; and light amount measurement devices, measuring the amount of light of an optical signal transmitted to the control devices via the communication cable. Each control device monitors the amount of light measured by the light amount measurement device corresponding thereto, and determines a state of the communication cable corresponding thereto based on the amount of light.

10 Claims, 8 Drawing Sheets

(51) Int. Cl.
*B25J 9/16* (2006.01)
*G06N 3/008* (2023.01)
*H04B 10/079* (2013.01)

(58) Field of Classification Search
CPC .............. H04B 1/3827; H04B 10/032; H04B 2201/709709; H04B 7/1851; H04B 1/40; H04B 10/03; H04B 10/038; H04B 17/345; H04B 10/1149; H04B 10/25752; H04B 10/25759; H04B 10/25891; H04B 17/309; H04B 17/391; H04B 5/79; H04B 7/0617; H04B 7/0626; H04B 7/06952; H04B 7/088; H04B 10/075; H04B 10/1143; H04B 15/00; H04B 17/3913; H04B 7/0413; H04B 1/205; H04B 1/38; H04B 1/401; H04B 10/0775; H04B 10/27; H04B 10/503; H04B 10/70; H04B 13/02; H04B 17/24; H04B 17/30; H04B 17/328; H04B 17/373; H04B 3/46; H04B 3/54; H04B 5/26; H04B 7/0404; H04B 7/063; H04B 7/0695; H04B 7/18504; H04B 7/18513; B25J 11/00; B25J 15/12; B25J 19/066; B25J 13/025; B25J 15/10; B25J 9/003; B25J 11/0045; B25J 13/02; B25J 9/1651; B25J 9/1697; B25J 9/1664; B25J 9/161; B25J 9/1661; B25J 9/1679; B25J 9/1602; B25J 9/1674; B25J 9/163; B25J 9/16; B25J 19/0095; B25J 19/02; B25J 13/00; B25J 5/007; B25J 9/1689; B25J 19/00; B25J 13/006; B25J 9/1694; B25J 13/08; B25J 11/008; B25J 19/023; B25J 9/08; B25J 9/1676; B25J 11/0085; B25J 5/02; B25J 19/06; B25J 9/1682; B25J 13/06; B25J 9/1653; B25J 9/1669; B25J 9/1671; B25J 9/00; B25J 9/1656; B25J 9/0084; B25J 9/1617; B25J 9/1666; B25J 9/162; B25J 11/0005; B25J 15/0014; B25J 19/0004; B25J 9/1684; B25J 18/00; B25J 19/04; B25J 5/00; B25J 9/0009; B25J 9/126; B25J 9/0081; B25J 19/021; B25J 17/00; B25J 3/00; B25J 11/005; B25J 13/088; B25J 19/0025; B25J 9/1628; B25J 9/042; B25J 15/0052; B25J 9/1687; B25J 9/1692; B25J 11/0095; B25J 13/087; B25J 15/00; B25J 9/0048; B25J 9/02; B25J 9/1605; B25J 15/08; B25J 19/026; B25J 9/1065; B25J 9/1612; B25J 11/0075; B25J 15/0019; B25J 15/0616; B25J 18/04; B25J 5/005; B25J 9/1635; B25J 13/085; B25J 13/089; B25J 19/022; B25J 9/0093; B25J 15/0028; B25J 15/02; B25J 19/0029; B25J 9/1015; B25J 9/104; B25J 11/0025; B25J 13/081; B25J 15/026; B25J 17/0241; B25J 19/005; B25J 19/0066; B25J 19/025; B25J 3/04; B25J 9/044; B25J 9/10; B25J 9/1615; B25J 11/002; B25J 15/0023; B25J 19/0075; B25J 19/0091; B25J 9/0003; B25J 9/142; B25J 9/1643; B25J 11/009; B25J 13/003; B25J 15/0253; B25J 19/0037; B25J 19/0062; B25J 19/061; B25J 9/0018; B25J 9/0087; B25J 9/041; B25J 9/046; B25J 9/106; G06N 3/008; G06N 20/00; G06N 3/08; G06N 5/02; G06N 5/043; G06N 3/045; G06N 3/006; G06N 3/04; G06N 3/044; G06N 3/048; G06N 3/09; G06N 3/092; G06N 5/022; G06N 5/04; G02B 6/50

See application file for complete search history.

(56) References Cited

U.S. PATENT DOCUMENTS

| | | | |
|---|---|---|---|
| 2018/0083827 A1 | 3/2018 | Ishizaki | |
| 2019/0190745 A1* | 6/2019 | Ishizaki | ............... H04L 12/423 |
| 2019/0220337 A1* | 7/2019 | Ishizaki | ............... B62D 57/032 |

FOREIGN PATENT DOCUMENTS

| | | | | | |
|---|---|---|---|---|---|
| CN | 115256414 | B | * | 7/2023 | |
| EP | 3470181 | A1 | * | 4/2019 | .......... B25J 15/0009 |
| FR | 3060182 | A1 | * | 6/2018 | ............. B25J 19/06 |
| JP | H01141442 | | | 6/1989 | |
| JP | 2001326663 | | | 11/2001 | |
| JP | 2016192597 | | | 11/2016 | |
| JP | 2017011519 | | | 1/2017 | |
| JP | 2017163391 | | | 9/2017 | |
| JP | 2017175231 | | | 9/2017 | |
| JP | 6471021 | | | 2/2019 | |
| JP | 6527399 | | | 6/2019 | |
| KR | 20200054968 | A | * | 5/2020 | |
| WO | WO-2018083970 | A1 | * | 5/2018 | ............ G01M 11/02 |
| WO | WO-2021131417 | A1 | * | 7/2021 | |

\* cited by examiner

ROBOT

CROSS-REFERENCE TO RELATED APPLICATIONS

This application claims the priority benefit of Japan Application No. 2022-031195, filed on Mar. 1, 2022. The entirety of the above-mentioned patent application is hereby incorporated by reference herein and made a part of this specification.

BACKGROUND

Technical Field

The disclosure relates to a robot, and more particularly to a robot including a base and a plurality of control devices, the control devices being distributedly arranged in a plurality of links connected in series to the base.

Related Art

A ring network system is conventionally known in which a plurality of computers (network nodes) are connected to each other via a ring network. In this communication system, a token ring communication method is known in which signal collision can be avoided by allowing only a node that has obtained a token to transmit data (see Patent Document 1). On the other hand, the token ring communication method does not allow multiple nodes to transmit data on the network at the same time.

Accordingly, the present applicant has proposed a ring network system in which multiple nodes are able to transmit data at the same time (see Patent Documents 2 and 3). In these systems, a node includes a data sender (transmitter) and an output switching part (sender), the data sender (transmitter) having a data transmission block that transmits data generated by the local node as transmission data and a data relay block that relays transmission data transmitted from another node as relay data. The output switching part, while switching one of the transmission data and the relay data to output data, outputs the output data.

In the communication system of Patent Document 2, at least one of the data transmitter and the output switching part of each node includes an error detector that detects abnormal data during data output on the fly. In the case where the error detector detects the abnormal data, the data transmitter or the output switching part that includes the error detector aborts the data output in the middle, adds error data to the end of the aborted data and outputs the resulting data.

[Patent Document 1] Japanese Patent Laid-open No. 2001-326663
[Patent Document 2] Japanese Patent No. 6471021
[Patent Document 3] Japanese Patent No. 6527399

In the case where a communication system is applied to a robot, a communication cable of a network is arranged over a plurality of links. In this case, the communication cable may be disconnected at a portion passing through a joint between the links. In the above ring network communication system, each node is able to freely output data. Accordingly, by configuring the system so that each node regularly transmits data and monitoring the presence or absence of the data input by the node, a node that does not transmit data (or to which data cannot be delivered) may be identified, and a place on the network where an abnormality has occurred may be identified. However, when an abnormality occurs in a node, it cannot be identified whether the abnormality is due to disconnection of the communication cable or due to node failure.

SUMMARY

One aspect of the disclosure provides a robot including: a plurality of links, connected in series to a base via a plurality of joints; a plurality of actuators, driving the joints to relatively displace a corresponding pair of the links connected to each other; a plurality of control devices, distributedly arranged in the base and the links and controlling the actuators; a communication cable, including an optical fiber connecting the control devices to each other and transmitting information; and a plurality of light amount measurement devices, measuring amount of light of an optical signal transmitted to the control devices via the communication cable. Each control device monitors the amount of light measured by the light amount measurement device corresponding thereto, and determines a state of the communication cable corresponding thereto based on the amount of light.

DESCRIPTION OF THE EMBODIMENTS

Figure 1:
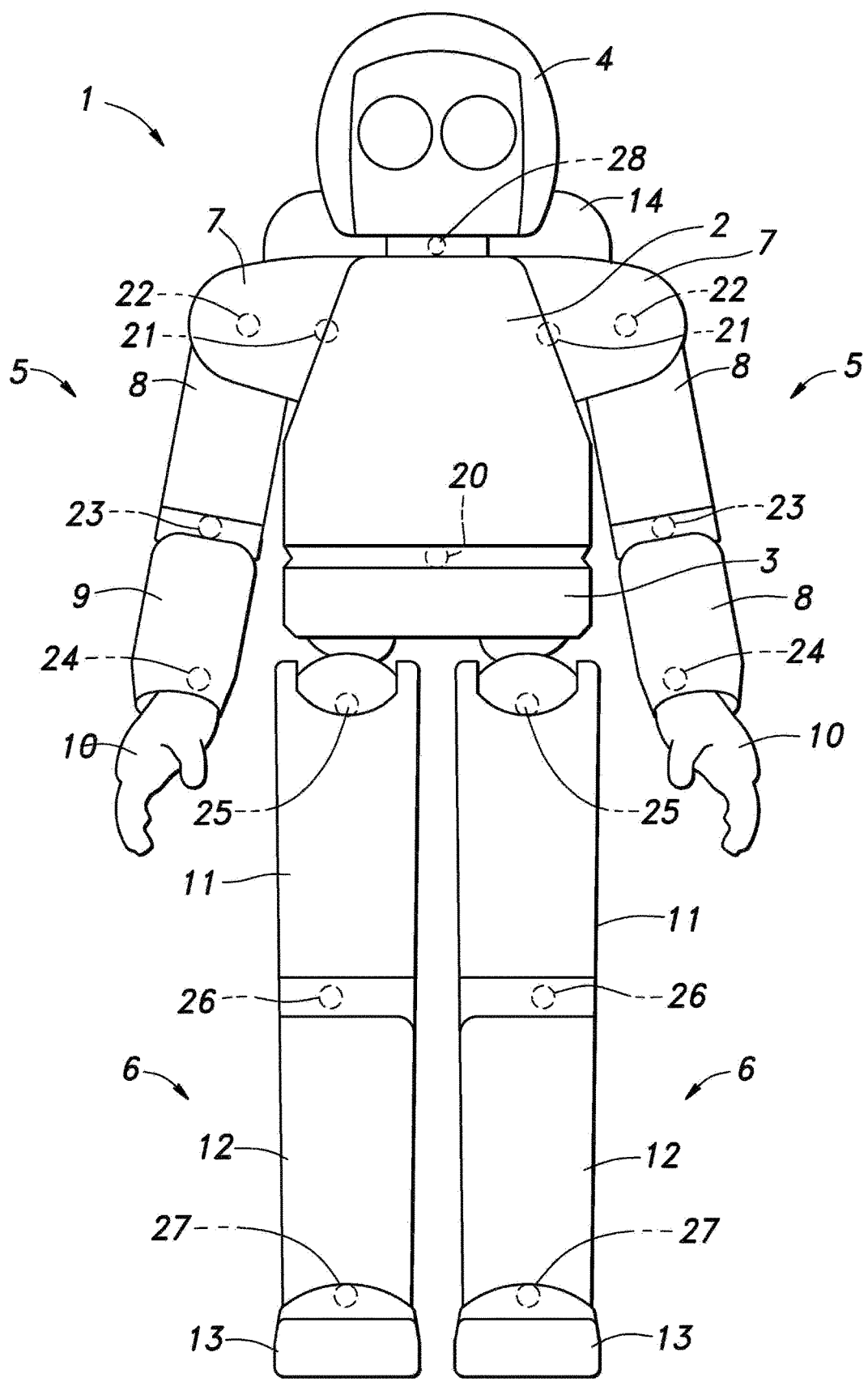
FIG. 1 is a front view of a robot according to an embodiment.

In the disclosure, an abnormality in a communication cable can be detected before disconnection in order to suppress the occurrence of disconnection abnormality.

An aspect of the disclosure provides a robot (1) including: a plurality of links (7 to 10), connected in series to a base (2) via a plurality of joints (21 to 24); a plurality of actuators (29), driving the joints to relatively displace a corresponding pair of the links connected to each other; a plurality of control devices (32), distributedly arranged in the base and the links and controlling the actuators; a communication cable (31), including an optical fiber connecting the control devices to each other and transmitting information; and a plurality of light amount measurement devices (40), measuring amount of light (I) of an optical signal transmitted to the control devices via the communication cable. Each control device monitors the amount of light measured by the light amount measurement device corresponding thereto, and determines a state of the communication cable corresponding thereto based on the amount of light.

According to this aspect, an abnormality in a communication cable can be detected before disconnection. Thus, in the robot, for example, it is possible to drive only the joints other than the joint through which the communication cable where an abnormality has occurred passes, and realize fall back operation while maintaining high responsiveness.

In the above aspect, when a decrease amount per unit time ($\Delta I/\Delta t$) of the amount of light measured by the light amount measurement device corresponding thereto is greater than a predetermined first threshold (TH1), each control device may determine that the state of the communication cable corresponding thereto is abnormal.

According to this aspect, an abnormality in the communication cable caused by sudden bending deformation of the optical fiber can be detected.

In the above aspect, when the amount of light measured by the light amount measurement device corresponding thereto is less than a predetermined second threshold (TH2), each control device may determine that the state of the communication cable corresponding thereto is abnormal.

According to this aspect, an abnormality in the communication cable caused by deterioration in durability of the optical fiber can be detected.

In the above aspect, the control device may constitute a node (32) of a ring network communication system (30) in which data is transmitted in one direction on a ring network formed in a ring shape. Each node may include: a data generator (43), generating data to be sent to another node; a data transmitter (52), having a data transmission block (56) that transmits the data generated by the data generator of a local node as generation data (Dp), and a data relay block (55) that transmits data sent from the another node as relay data (Dr) to be relayed; an output switching part (57), switching the data to be sent to the another node between the generation data transmitted by the data transmission block and the relay data transmitted by the data relay block, and outputting the data as transmission data (Do); and a data receiver (53), receiving the data sent from the another node as reception data (Dir). At least one of the data transmitter and the output switching part of each node may include an error detector (61) that detects abnormal data during data output on the fly. When the error detector corresponding thereto detects the abnormal data, each node may determine that a state of a source node of the abnormal data is abnormal. If an abnormality is present in the amount of light measured by the light amount measurement device corresponding thereto, each node may determine that the state of the communication cable corresponding thereto is abnormal.

According to this aspect, when abnormal data is detected, each node is able to determine that a node that has generated data containing this abnormal data is in an abnormal state. Based on the amount of light, each node is also able to determine that the state of the communication cable corresponding thereto is abnormal. Thus, in the robot, for example, it is possible to drive only the joints other than the joint related to the abnormality, and realize fall back operation while maintaining high responsiveness.

In the above aspect, when the error detector corresponding thereto detects the abnormal data and it is determined that the state of the source node of the abnormal data is abnormal, each node may send data indicating the abnormality in the source node. At least one of the nodes may be a host node (32A) that transmits a control command for the actuator corresponding thereto to the another node. In the case where the data indicating the abnormality in the source node is received, the host node may not transmit the control command to the source node related thereto.

According to this aspect, by the host node transmitting the control command only to the nodes other than the source node of the data containing the abnormal data, fall back operation control that drives only some of the joints can be executed while high responsiveness is maintained.

In the above aspect, when it is determined that the state of the communication cable corresponding thereto is abnormal based on the amount of light measured by the light amount measurement device corresponding thereto, each node may send data indicating the abnormality in the communication cable. At least one of the nodes may be a host node (32A) that transmits a control command for the actuator corresponding thereto to the another node. In the case where the data indicating the abnormality in the communication cable is received, the host node may not transmit the control command to the node related to the abnormality in the communication cable.

According to this aspect, by the host node transmitting the control command only to the nodes other than the node related to the abnormality in the communication cable, fall back operation control that drives only some of the joints can be executed while high responsiveness is maintained.

According to the above aspects, an abnormality in a communication cable can be detected before disconnection.

An embodiment of a robot 1 according to the disclosure is described with reference to the drawings.

As shown in FIG. 1, the robot 1 according to an embodiment is a bipedal walking humanoid robot that autonomously walks and runs. The robot 1 includes a body 2 forming a base, and a waist 3, a head 4, left and right arms 5, and left and right legs 6. Each arm 5 is a multi-link mechanism including a shoulder 7, an upper arm 8, a forearm 9, and a hand 10, each of which forms a link. Each leg 6 is a multi-link mechanism including a thigh 11, a lower leg 12, and a foot 13, each of which forms a link. The robot 1 carries an electrical component box 14 on the back of the body 2. The electrical component box 14 accommodates a battery, a DC-DC converter, and the like.

The waist 3 is connected to the body 2 by a waist joint 20. The shoulder 7 is connected to the body 2 by a first shoulder joint 21. The upper arm 8 is connected to the shoulder 7 by a second shoulder joint 22. The forearm 9 is connected to the upper arm 8 by an elbow joint 23. The hand 10 is connected to the forearm 9 by a hand joint 24. The thigh 11 is connected to the waist 3 by a hip joint 25. The lower leg 12 is connected to the thigh 11 by a knee joint 26. The foot 13 is connected to the lower leg 12 by a foot joint 27. That is, a plurality of links constituting the arm 5 or the leg 6 are connected in series to the body 2. The head 4 is connected to the body 2 by a neck joint 28. In FIG. 1, an approximate center of each joint (20 to 28) is indicated by a dashed circle. Each joint may connect a corresponding pair of links to be rotatable about one axis or to be rotatable about two axes.

Figure 2:
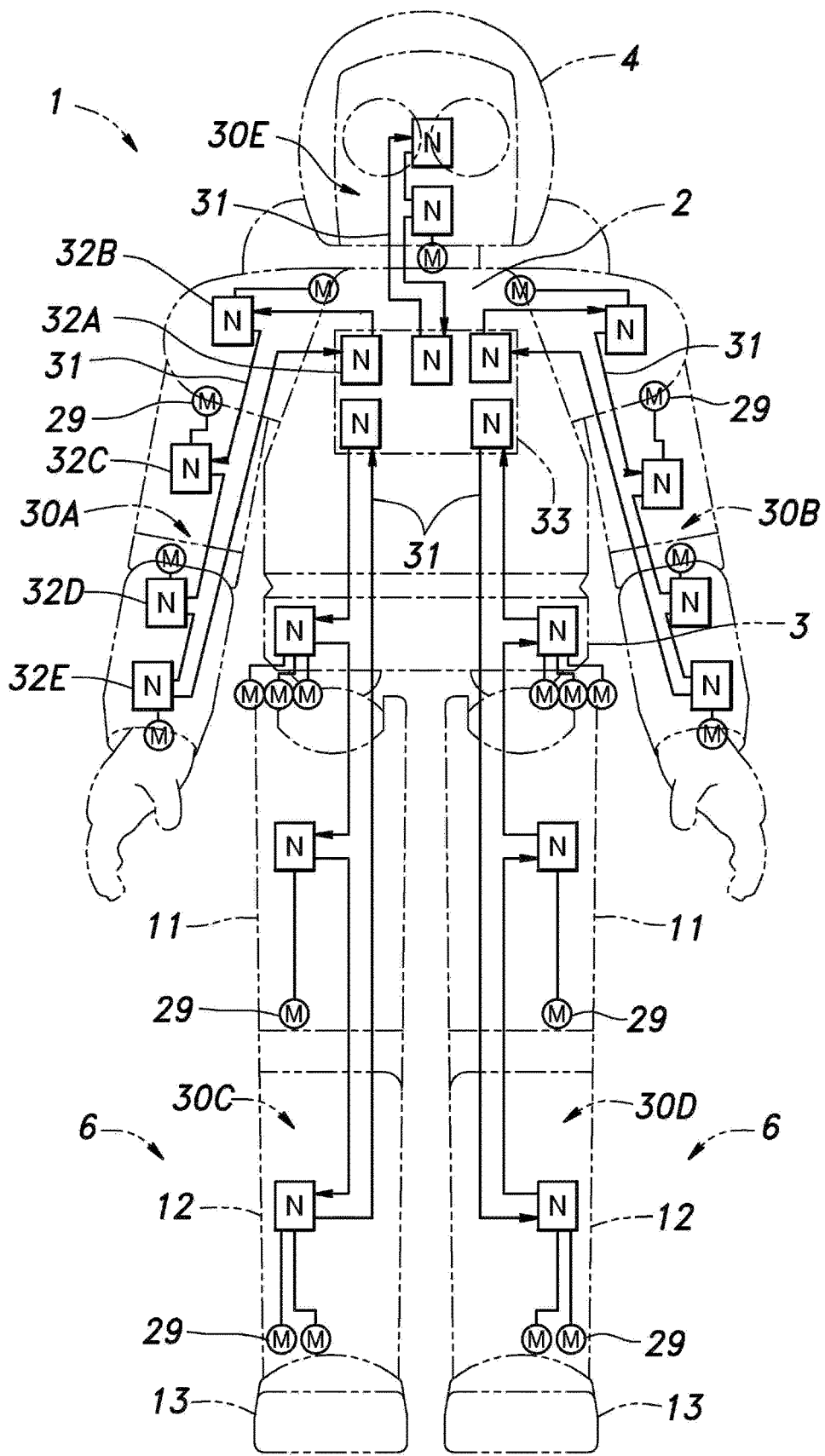
FIG. 2 is a layout diagram of a communication system provided in the robot shown in FIG. 1.

As shown in FIG. 2, each joint is provided with electric motors 29 whose number corresponds to the number of connection parts around an axis. By rotationally driving a corresponding connection part around the axis by the electric motor 29, each joint changes a relative angle of the corresponding pair of links. Each electric motor 29 constitutes an actuator that drives a corresponding joint.

In the robot 1, as a network communication system for controlling an operation of each part, a plurality of ring network communication systems (hereinafter simply referred to as "communication system 30") (30A to 30E) formed in a ring shape are provided. Specifically, a first communication system 30A for controlling an operation of the right arm 5, a second communication system 30B for controlling an operation of the left arm 5, a third communication system 30C for controlling an operation of the right leg 6, a fourth communication system 30D for controlling an operation of the left leg 6, and a fifth communication system 30E for controlling an operation of the head 4 are provided. Although not shown, a sixth communication system for controlling an operation of the waist 3 or the like may further be provided in the robot 1.

The first communication system 30A includes a plurality of nodes 32 (32A to 32E) that are communicably connected to each other by a communication cable 31 and are denoted by "N" in the figure. The plurality of nodes 32 (32A to 32E) are distributedly arranged in the body 2 and the links (7 to 9) constituting the right arm 5. The second communication system 30B has the same configuration bilaterally symmetrical to that of the first communication system 30A. The third communication system 30C includes a plurality of nodes 32 distributedly arranged in the body 2, the waist 3, and the links (3, 11, 12) constituting the right leg 6. The plurality of nodes 32 are communicably connected to each other by the communication cable 31. The fourth communication system 30D has the same configuration bilaterally symmetrical to that of the third communication system 30C. The fifth communication system 30E includes a plurality of nodes 32 that are distributedly arranged in the body 2 and the head 4 and are communicably connected to each other by the communication cable 31.

Each communication system 30 is configured as the same control system. The configuration and control are described in detail below taking the first communication system 30A as an example.

A node 32A of the first communication system 30A arranged in the body 2 functions as a host node that generates and transmits a control command with respect to other nodes 32B to 32E in the communication system 30 to which the node 32A belongs. The nodes 32B to 32E other than the host node are agent nodes each forming a control device that controls one of the joints from the first shoulder joint 21 to the hand joint 24 and operating in accordance with the control command of the host node.

The nodes 32B to 32E being the agent nodes are arranged in the links from the shoulder 7 to the forearm 9. Some of the agent nodes may be arranged in the body 2 or the hand 10. The first communication system 30A coordinates and controls an operation of the right arm 5. Each of the first to fifth communication systems 30 forms a distributed control system in which the nodes 32 controlling each part of the robot 1 composed of a plurality of links connected in series to the body 2 via a plurality of joints are distributedly arranged.

The communication cable 31 of the first communication system 30A is laid in the robot 1 so as to extend from the body 2 to the forearm 9 through four joints (21 to 24). In the communication system 30, a signal transmission direction is predetermined. In the first communication system 30A, connection is provided so that a signal is transmitted from the node 32A provided in the body 2 that forms the host node to the node 32B provided in the shoulder 7 that forms the agent node, the node 32C provided in the upper arm 8, the node 32D provided in the forearm 9, and the node 32E in this order and is returned to the node 32A. An optical fiber cable is used for the communication cable 31 of the present embodiment, and an optical signal is transmitted through the communication cable 31.

In the first communication system 30A, the node 32B controls the electric motor 29 that drives the first shoulder joint 21. The node 32C controls the electric motor 29 that drives the second shoulder joint 22. The node 32D controls the electric motor 29 that drives the elbow joint 23. The node 32E controls the electric motor 29 that drives the hand joint 24.

Figure 3:
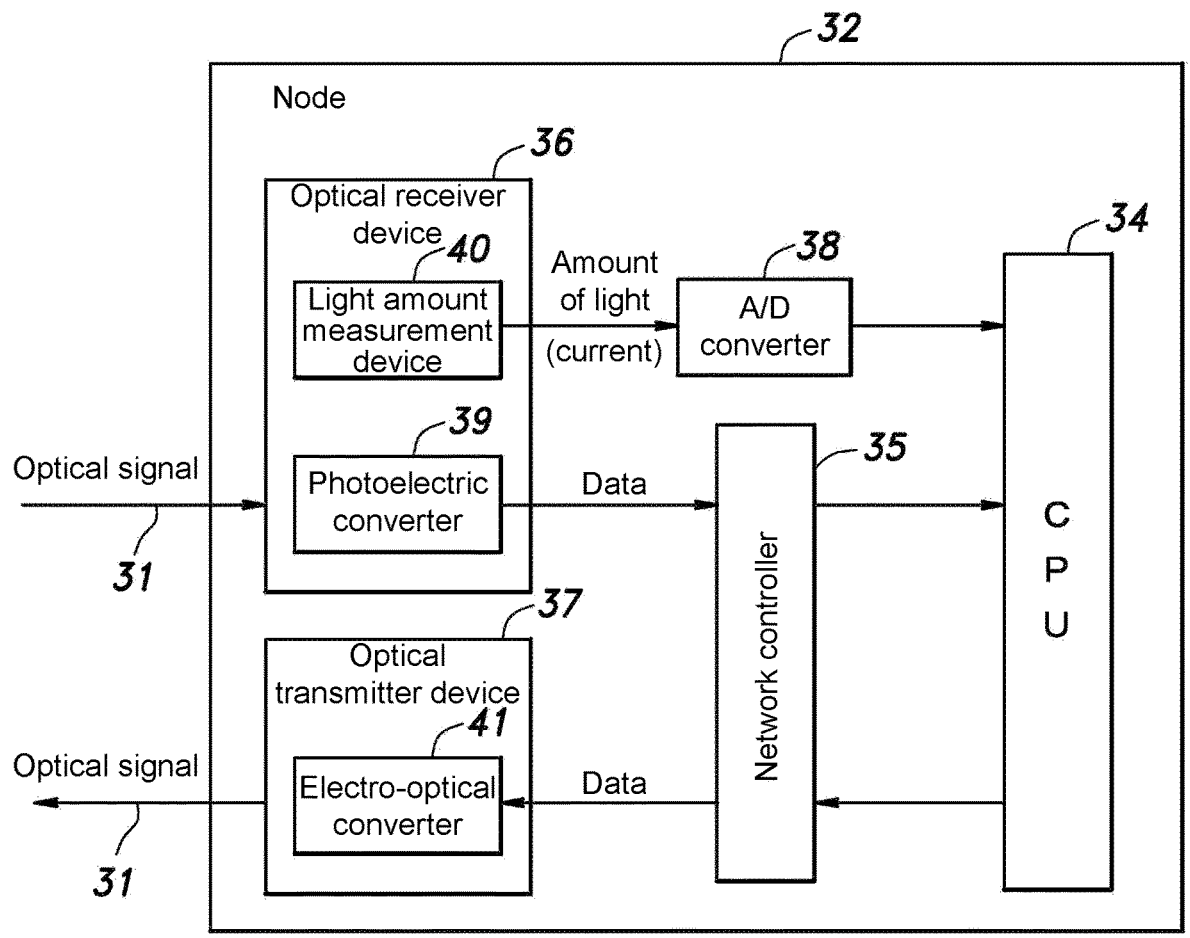
FIG. 3 illustrates a configuration of each node shown in FIG. 1.

FIG. 3 illustrates a configuration of each node shown in FIG. 1. As shown in FIG. 3, each node 32 includes a CPU 34 forming an arithmetic processing unit, a network controller 35, an optical receiver device 36, an optical transmitter device 37, an A/D converter 38, and a memory (storage) not shown. The network controller 35 is configured to send data D in one direction along the communication system 30.

The optical receiver device 36 is a device that receives an optical signal sent from the node 32 on an upstream side and transmitted through the communication cable 31. The optical receiver device 36 includes a photoelectric converter 39 converting an optical signal into an electrical signal and a light amount measurement device 40 measuring the amount of light I. The data D converted into an electrical signal by the photoelectric converter 39 is input to the network controller 35. In the case where a destination to which the data D is transmitted is the local node, the data D is used by the CPU 34.

An analog signal indicating the amount of light I of the optical signal measured by the light amount measurement device 40 is converted into a digital signal by the A/D converter 38 and supplied to the CPU 34. When the CPU 34 generates the data D, the CPU 34 transmits the data D to the network controller 35. The network controller 35 sends, to the optical transmitter device 37, the data D transmitted from the CPU 34 and the data D transmitted from the optical receiver device 36 and addressed to another node.

The optical transmitter device 37 is a device that converts an electrical signal sent from the network controller 35 into an optical signal and sends the optical signal. The optical transmitter device 37 includes an electro-optical converter 41 converting an electrical signal into an optical signal. The data D converted into an optical signal by the electro-optical converter 41 is transmitted toward the node 32 on a downstream side via the communication cable 31.

Each node 32 is a control device that, in accordance with the control command received from the host node or based on the data D calculated by arithmetic processing by the CPU 34 using software, separately controls a corresponding control object composed of hardware. The hardware is an electrical device electrically connected to a power supply, and may be a driver that controls power supplied to the electric motor 29 forming an actuator. The hardware may also include an electromagnetic valve, a lighting fixture, an electric element, and a driver thereof.

The data D communicated over the communication system 30 includes two types, namely, normal data used for normal control of hardware performed by a control part 44 described later, and interrupt data generated when hardware is controlled without via the control part 44. The interrupt data takes precedence over the normal data. A detailed description of the two types of data D is omitted herein. If necessary, please refer to Japanese Patent Laid-open No. 2017-175231 filed by the present applicant.

Figure 4:
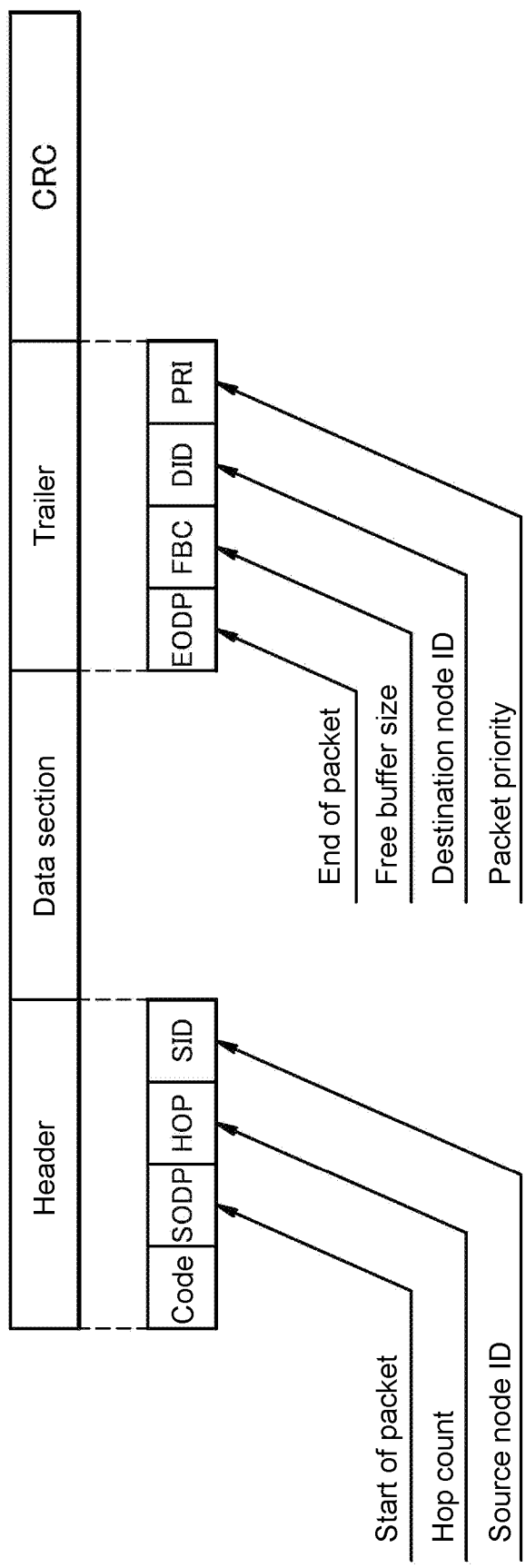
FIG. 4 illustrates a configuration of a data packet.

The data D is transmitted on the ring network in units of packets (that is, as data packets) having a structure as shown in FIG. 4. As shown in FIG. 4, a packet containing the data D is composed of a frame including, in order from the top, a header, a data section (data D), a trailer, and a cyclic redundancy check (CRC). The header includes a code, a start of packet (SODP), a hop count (HOP) and a source node ID (SID). The trailer includes an end of packet (EODP), a free buffer size (FBC), a destination node ID (DID) and a packet priority (PRI). The data section may be configured as one piece containing all the data D necessary for a series of commands, without being limited in size (bytes). Alternatively, the data section may be limited to a predetermined size, and may be one of a plurality of pieces of the data D obtained by division in the case where the data D necessary for a series of commands is of a size greater than the predetermined size.

Figure 5:
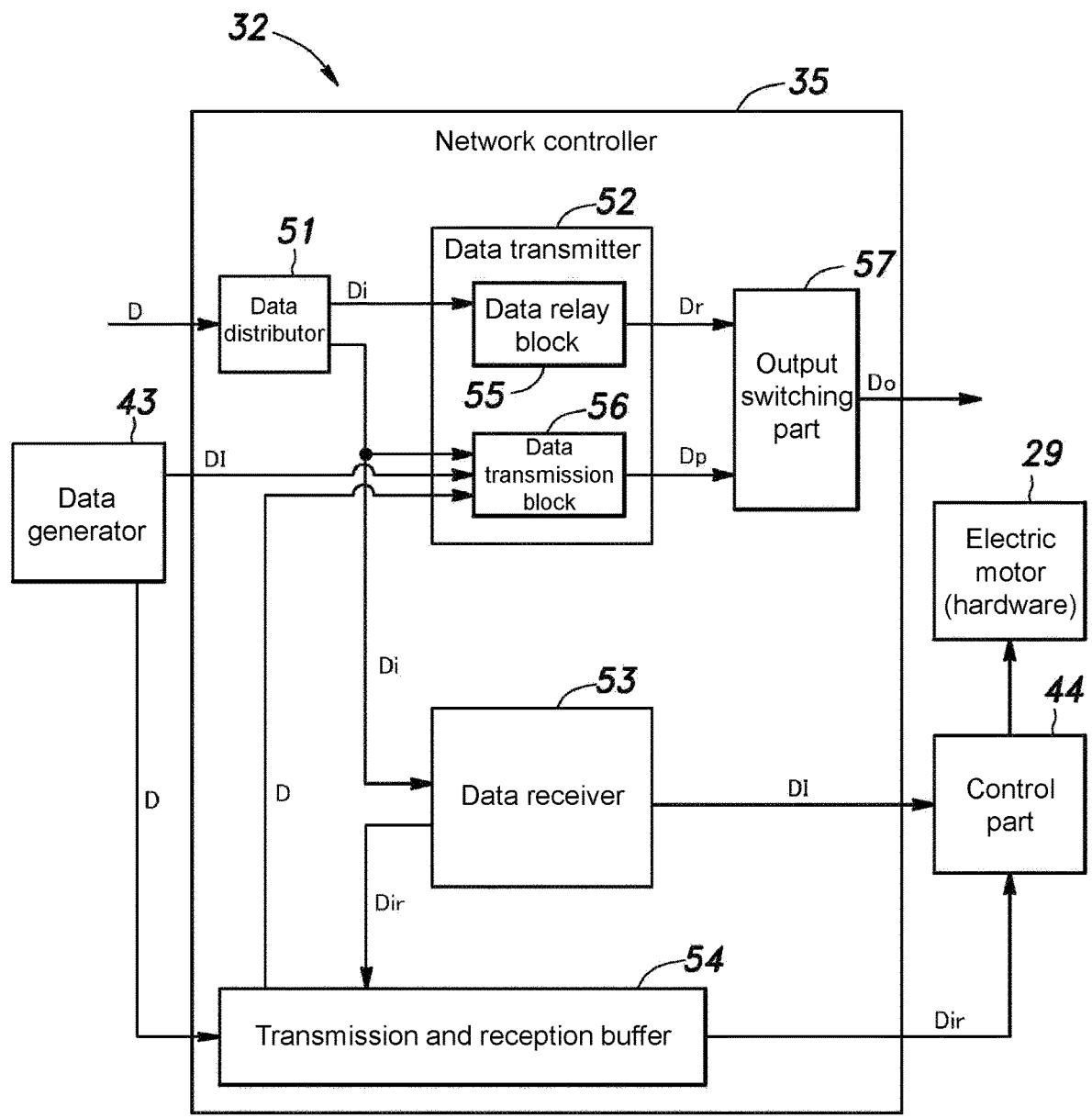
FIG. 5 is functional block diagram of each node shown in FIG. 1.

FIG. 5 is a functional block diagram of each node 32. As shown in FIG. 5, each node 32 includes the network controller 35 configured by hardware, and a software-driven data generator 43 and a software-driven control part 44 that are functional parts by the CPU 34. The data generator 43 performs arithmetic processing using software by the CPU 34, and generates the data D to be transmitted to another node 32 or data-related information (hereinafter referred to as data information DI) such as a code or priority to be added to the data D. The data generator 43 is configured to generate the data D in accordance with a predetermined repetition pattern (for example, at predetermined time intervals). The control part 44 performs arithmetic processing using software by the CPU 34 based on at least the data D contained in a packet transmitted from another node 32, and drives and controls the electric motor 29.

At each node 32, the data D transmitted from the upstream side of the communication system 30 is input to the network controller 35. The network controller 35 includes a data distributor 51. The data D (hereinafter referred to as input data Di) input to each node 32 is distributed by the data distributor 51 to each of a data transmitter 52 and a data receiver 53.

The data generator 43 writes the generated data D with respect to another node 32 to a transmission and reception buffer 54 and transmits the data information DI to the data transmitter 52.

The data transmitter 52 has a data relay block 55 and a data transmission block 56. In the case where the input data Di distributed from the data distributor 51 contains another node as a destination, the data relay block 55 transmits the input data Di as relay data Dr. The data transmission block 56 reads, from the transmission and reception buffer 54, the data D corresponding to the data information DI written by the data generator 43, and transmits it as generation data Dp.

In the case where the input data Di distributed from the data distributor 51 contains the local node as a destination and is to be received, the data receiver 53 receives the input data Di as reception data Dir and writes it to the transmission and reception buffer 54. The data receiver 53 transmits the data information DI of the reception data Dir to the control part 44. The reception data Dir written to the transmission and reception buffer 54 is read by the control part 44 based on the data information DI and is provided to the control part 44.

The relay data Dr transmitted from the data relay block 55 and the generation data Dp transmitted from the data transmission block 56 are input to an output switching part 57. The output switching part 57 switches the data D sent to another node between the generation data Dp transmitted by the data transmission block 56 and the relay data Dr transmitted by the data relay block 55, and outputs the data D as transmission data Do. Since the transmission data Do is switched in this way and collision of the data D does not occur, a plurality of nodes 32 are able to send the data D on the ring network at the same time.

It is not necessary that all the nodes 32 have all these functions. For example, at the node 32A being the host node, since operation control of the electric motor 29 is not performed, the control part 44 does not perform operation control of the electric motor 29 based on the reception data Dir received from another node 32. Instead, at the node 32A, the data generator 43 generates the data D containing a control command containing a data transmission request with respect to another node 32 or a request with respect to another node 32 for driving the electric motor 29 and transmitting data to the electric motor 29. The host node functions as a central control device that controls other agent nodes.

Although a detailed description of each of these parts is omitted, if necessary, please refer to Japanese Patent Laid-open No. 2017-11519 and Japanese Patent Laid-open No. 2017-175231 filed by the present applicant. The data relay block 55 is described below.

Figure 6:
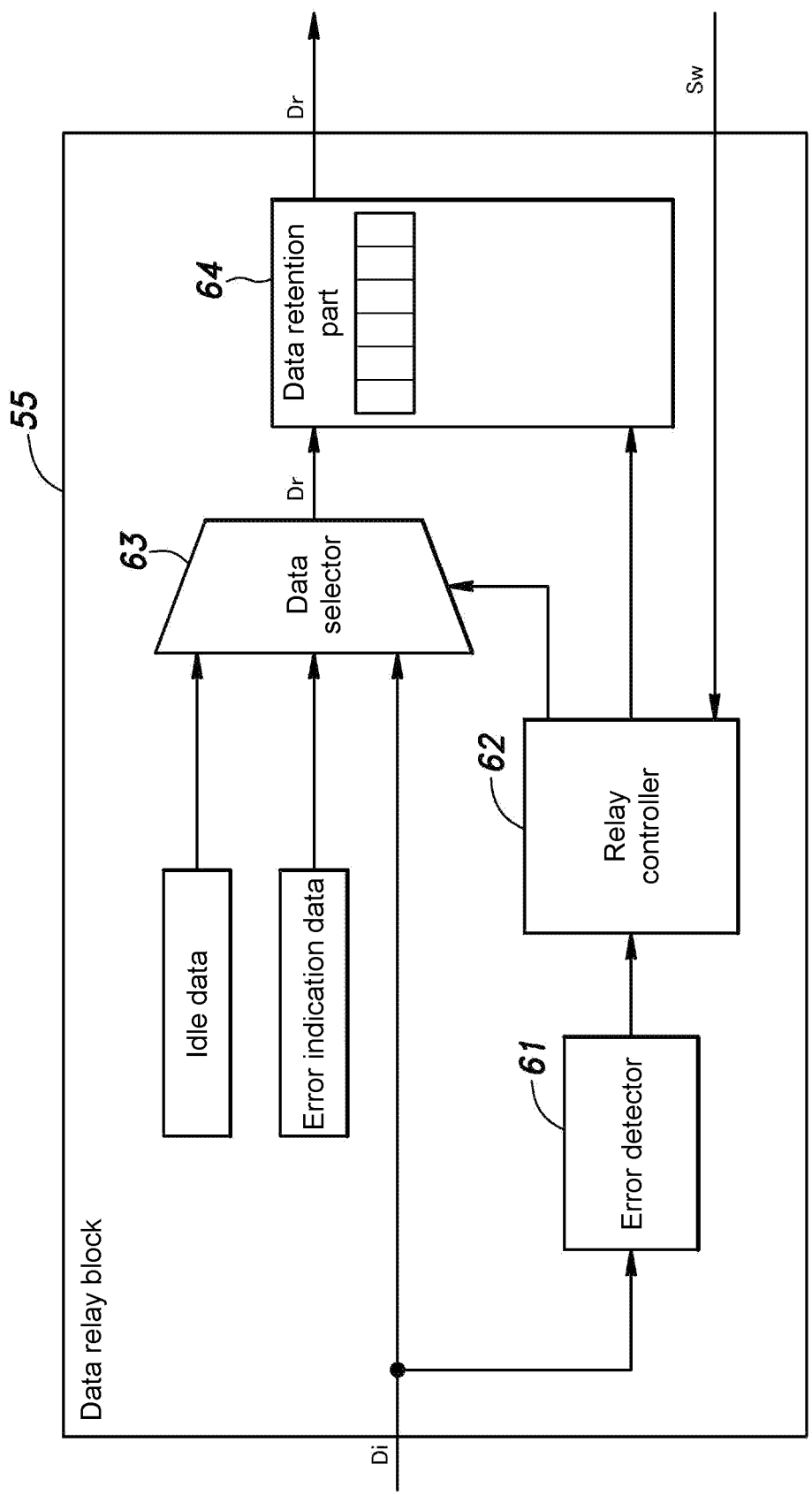
FIG. 6 is a functional block diagram of a data relay block shown in FIG. 5.

As shown in FIG. 6, in the data relay block 55, an error detector 61 performs relay determination of the input data Di. Specifically, based on a local node ID (SID) of the data information DI, the error detector 61 determines whether the input data Di is generated by the local node. Based on a hop count (HOP), the error detector 61 determines whether there is a relay abnormality, specifically whether the hop count is equal to or greater than the number of nodes on the network. Furthermore, the error detector 61 checks a CRC value of the input data Di and determines whether this value is an abnormal value (whether error indication data is added). The error detector 61 outputs a determination result to a relay controller 62. In this way, the error detector 61 detects abnormal data during output of the data D on the fly.

Based on the determination result of the error detector 61, the relay controller 62 relays or discards the input data Di. Specifically, if the input data Di is generated by the local node, the relay controller 62 discards the input data Di as data that has circulated one round through the ring of the network. If the hop count of the input data Di is equal to or greater than the number of nodes, the relay controller 62 determines that the input data Di is abnormal data. Then, the relay controller 62 provides a data selector 63 with an output data selection signal instructing that error indication data and idle data be output, so that the input data Di is discarded. Also, if the CRC value is an abnormal value, the relay controller 62 determines that the input data Di is abnormal data, and provides the data selector 63 with the output data selection signal instructing that error indication data and idle data be output, so that the input data Di is discarded. An output waiting signal Sw is input to the relay controller 62 from the output switching part 57 (see FIG. 5).

On the other hand, if the error detector 61 determines that the input data Di is normal and is the relay data Dr to be relayed, the relay controller 62 increments a hop count of the relay data Dr and performs data selection control with respect to the data selector 63. The relay controller 62 performs data input/output control with respect to a data retention part 64 in response to the output waiting signal Sw. In accordance with a command of the relay controller 62, the data selector 63 selects one of the idle data, the error indication data and the input data Di, and writes the relay data Dr to the data retention part 64. When the output waiting signal Sw is not input to the relay controller 62 and the relay controller 62 issues a data output command, the data retention part 64 transmits the retained relay data Dr.

The relay controller 62 of the data relay block 55 is configured by hardware programmed to perform a predetermined operation described above. As the hardware constituting the relay controller 62, a hardware logic circuit such as an application specific integrated circuit (ASIC), a programmable logic device (PLD), or an application specific standard product (ASSP) may be used. In the case of using an ASIC, the ASIC may be of a master slice type, such as a gate array or a structured ASIC, or of a custom type, such as a cell-based ASIC. In the case of using a PLD, the PLD may be a PLD in a narrow sense including a simple PLD and a complex PLD (CPLD), or may be a PLD in a broad sense further including a field-programmable gate array (FPGA). The hardware is preferably a programmable logic device (PLD).

In the case where the relay data Dr transmitted from the data retention part 64 contains the error indication data, the node 32 that has received the relay data Dr determines that a state of the node 32 corresponding to a source (SID) of the relay data Dr is abnormal. That is, each node 32 is able to determine that the node 32 that generated the relay data Dr containing this abnormal data is in an abnormal state.

In the case where the node 32A being the host node receives the relay data Dr, the node 32A does not transmit a control command to the node 32 of the source of the relay data Dr containing the abnormal data. In other words, by the node 32A transmitting the control command only to the nodes 32 other than the node 32 of the source of the relay data Dr containing the abnormal data, fall back operation control that drives only some of the joints can be executed while high responsiveness is maintained.

In the present embodiment, the error detector 61 is provided in the data relay block 55. However, the error detector 61 may be provided in the output switching part 57 in other embodiments.

Next, a mode of abnormality in the communication cable 31 in the communication system 30 is described with reference to FIG. 2 and FIG. 7. As shown in FIG. 2, since the communication cable 31 is wired to pass through a joint, when the joint is driven by the electric motor 29, the communication cable 31 is bent. When the optical fiber undergoes sudden bending deformation, transmission of the optical signal may be hindered. As shown in (A) of FIG. 7, when such trouble occurs, the amount of light I passing through the communication cable 31 drops sharply. When the bending deformation progresses further and the amount of light I decreases to a threshold I_th at which optical communication is enabled, reading of the data D from the optical signal becomes disabled.

Figure 7:
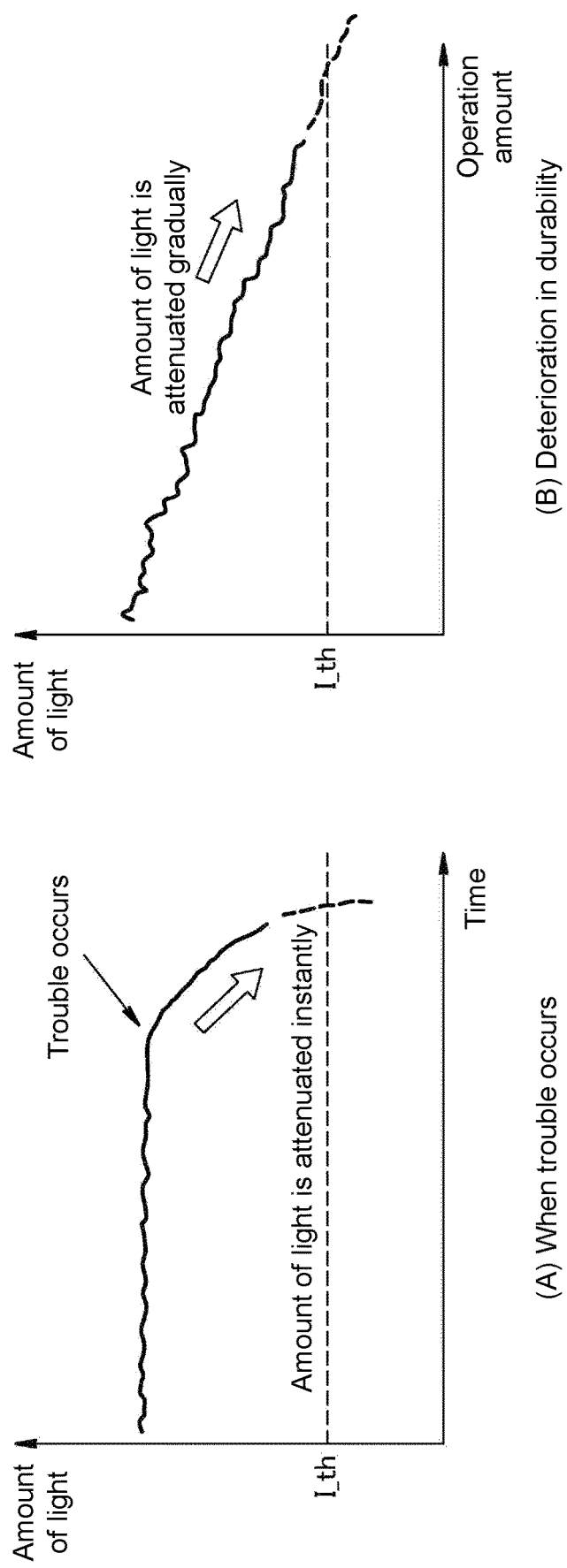
FIG. 7 is a graph for describing a mode of abnormality in a communication cable.

On the other hand, even if the communication cable 31 does not undergo bending deformation to the extent that transmission of the optical signal is hindered, durability of the optical fiber may deteriorate as an operation amount (accumulated amount of drive angle) of a joint increases, as shown in (B) of FIG. 7. Due to such deterioration in durability, the amount of light I passing through the communication cable 31 gradually decreases. When the operation of the joint continues and the amount of light I decreases to the threshold I_th at which optical communication is enabled, reading of the data D from the optical signal becomes disabled.

Accordingly, as shown in FIG. 3, the CPU 34 of each node 32 monitors the amount of light I of the optical signal measured by the light amount measurement device 40, and determines a state of the corresponding communication cable 31 based on the amount of light I. Accordingly, the node 32 is able to detect an abnormality before the communication cable 31 is disconnected. Thus, as described later, in the robot 1, it is possible to drive only the joints other than the joint through which the communication cable 31 where an abnormality has occurred passes, and realize fall back operation while maintaining high responsiveness.

Figure 8:
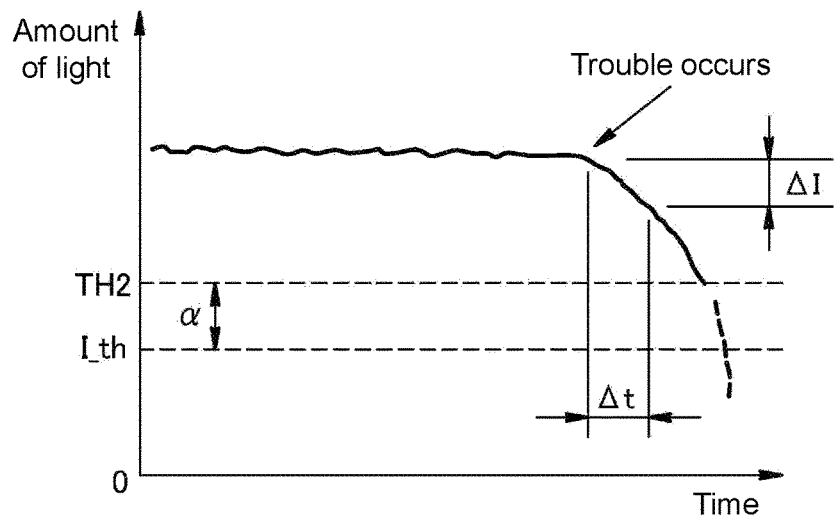
FIG. 8 describes determination of abnormality in a communication cable in a communication system according to an embodiment.

Specifically, the CPU 34 determines the state of the communication cable 31 as follows. FIG. 8 describes determination of abnormality in the communication cable 31 in the communication system 30 according to an embodiment.

As shown in FIG. 8, the CPU 34 monitors a decrease amount per unit time ΔI/Δt of the amount of light I measured by the light amount measurement device 40. When the decrease amount per unit time ΔI/Δt of the amount of light I is greater than a predetermined first threshold TH1, the CPU 34 determines that the state of the corresponding communication cable 31 is abnormal. Accordingly, the CPU 34 is able to detect an abnormality in the communication cable 31 caused by sudden bending deformation of the optical fiber.

The CPU 34 monitors the amount of light I measured by the light amount measurement device 40. When the amount of light I is less than a predetermined second threshold TH2, the CPU 34 determines that the state of the corresponding communication cable 31 is abnormal. The second threshold TH2 is set to a value greater by a predetermined amount a than the threshold I_th at which optical communication is enabled. Accordingly, the CPU 34 is able to detect an abnormality in the communication cable 31 caused by deterioration in durability of the optical fiber. By setting the second threshold TH2 to a value greater than the threshold I_th at which optical communication is enabled, the CPU 34 is able to detect an abnormality in the communication cable 31 before reading of the data D from the optical signal becomes disabled.

In this way, at each node 32, in the case where an abnormality is present in the amount of light I measured by the corresponding light amount measurement device 40, it can be determined that the state of the corresponding communication cable 31 is abnormal.

When the CPU 34 determines that the state of the communication cable 31 is abnormal, the data generator 43 generates the data D indicating that the state of the communication cable 31 is abnormal and sends the data D to the node 32A being the host node. When the node 32A receives the data D, the node 32A executes the fall back operation control that drives only the joints other than the joint through which the communication cable 31 where an abnormality has occurred passes. Accordingly, the node 32A being the host node is able to realize fall back operation while maintaining high responsiveness. A specific description is given below.

Figure 9:
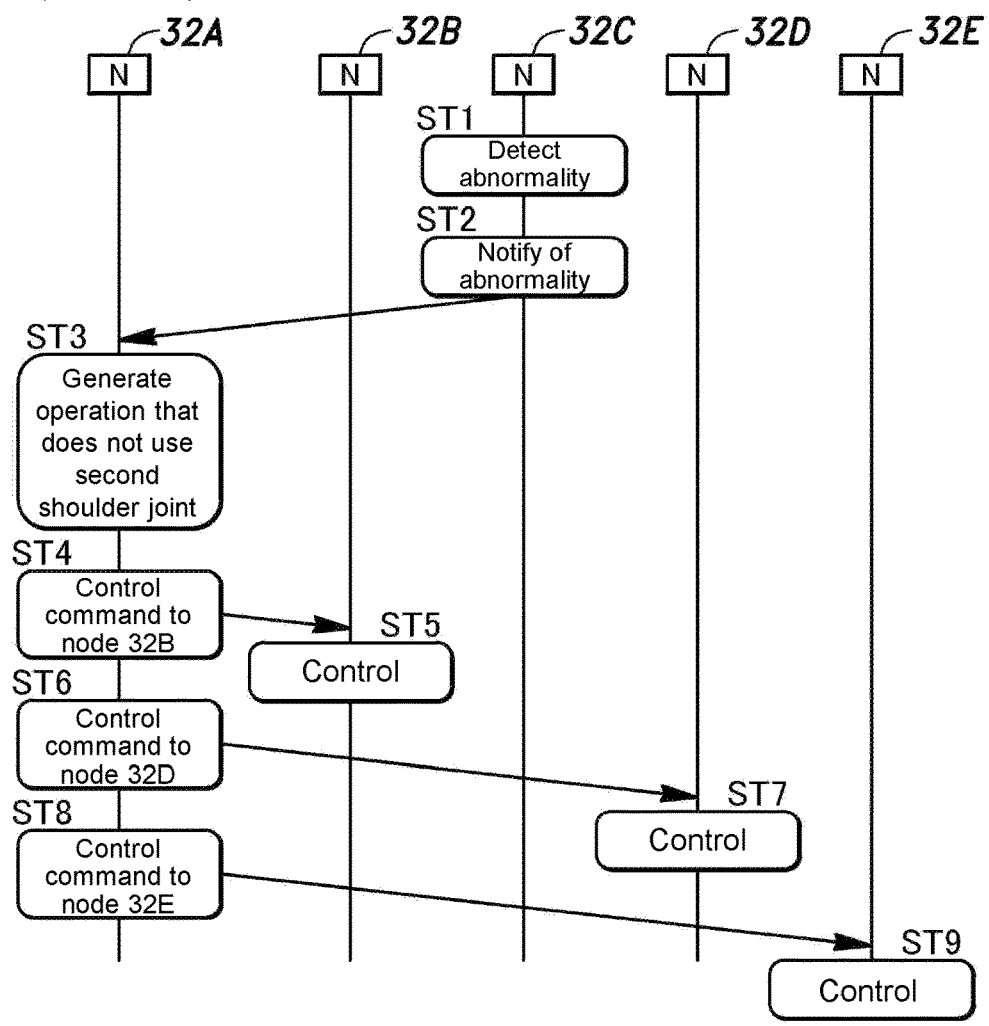
FIG. 9 describes a control method of a robot using a communication system according to an embodiment.

FIG. 9 describes a control method of the robot 1 using the communication system 30 according to an embodiment. As shown in FIG. 9, in this example, among the nodes 32B to 32E being the agent nodes, an abnormality in the communication cable 31 occurs at the node 32C, and the node 32C detects an abnormality in the communication cable 31 (step ST1). That is, as shown in FIG. 2, in the communication cable 31, an abnormality has occurred in the optical fiber of a portion that transmits the optical signal from the node 32B to the node 32C. This optical fiber passes through the second shoulder joint 22 (see FIG. 2), and the electric motor 29 that drives the second shoulder joint 22 is controlled by the node 32C. When detecting the abnormality in the communication cable 31, the node 32C generates the data D (abnormality notification) indicating the abnormality in the communication cable 31 and sends it to the node 32A being the host node (step ST2).

When receiving the abnormality notification about the communication cable 31 from the node 32C, the node 32A being the host node generates an operation that does not use the second shoulder joint 22 (step ST3). After that, the node 32A sends a control command to the node 32B being the agent node (step ST4). When receiving the control command with respect to the local node, the node 32B controls the electric motor 29 based on the control command (step ST5). The node 32A also sends a control command to the node 32D being the agent node (step ST6). When receiving the control command with respect to the local node, the node 32D controls the electric motor 29 based on the control command (step ST7). The node 32A further sends a control command to the node 32E being the agent node (step ST8). When receiving the control command with respect to the local node, the node 32E controls the electric motor 29 based on the control command (step ST9).

In this way, in the case where the node 32A being the host node receives the data D indicating an abnormality in the communication cable 31, the node 32A does not transmit a control command to the node 32C (that is, the node 32C driving a joint through which the abnormal communication cable 31 passes) related to the abnormality. In other words, by the node 32A transmitting the control command only to the nodes 32 (32B, 32D, 32E) other than the node 32C related to the abnormality in the communication cable 31, fall back operation control that drives only some of the joints can be executed while high responsiveness is maintained.

Although a specific embodiment has been described above, the disclosure is not limited to the above embodiment and may be widely modified. For example, in the above embodiment, the robot 1 is configured as a humanoid walking robot. On the other hand, it suffices if the robot 1 has multiple joints, and the robot 1 may be configured as a non-humanoid robot, a robot equipped with a traveling unit such as a wheel, an endless track or an omni-wheel as a means of transportation, or an immobile robot. The robot 1 does not have to be configured to perform an operation programmed by a control device, and may be an avatar robot serving as an avatar of a person and is operated by remote control.

In the above embodiment, the communication system 30 is configured as a ring network communication system including the ring-shaped communication cable 31 having a ring shape. However, other configurations such as a bus type, a star type, or a mesh type may be employed. The specific configuration, arrangement, quantity, or control procedure of each member or portion may be changed as appropriate within the scope of the disclosure. Not all the components or procedures shown in the above embodiment are essential, and the components or procedures may be selected as appropriate.

What is claimed is:

1. A robot, comprising:
a plurality of links, connected in series to a base via a plurality of joints;
a plurality of actuators, driving the joints to relatively displace a corresponding pair of the links connected to each other;
a plurality of control devices, distributedly arranged in the base and the links and controlling the actuators;
a communication cable, comprising an optical fiber connecting the control devices to each other and transmitting information; and
a plurality of light amount measurement devices, measuring amount of light of an optical signal transmitted to the control devices via the communication cable, wherein
each of the control devices monitors the amount of light measured by the light amount measurement device corresponding thereto, and determines whether a state of the communication cable corresponding thereto is abnormal based on the amount of light,
when the state of the communication cable is abnormal, only the joints other than the joint through which the communication cable where an abnormality has occurred passes are driven.

2. The robot according to claim 1, wherein,
in response to a decrease amount per unit time of the amount of light measured by the light amount measurement device corresponding thereto being greater than a predetermined first threshold, each of the control devices determines that the state of the communication cable corresponding thereto is abnormal.

3. The robot according to claim 1, wherein,
in response to the amount of light measured by the light amount measurement device corresponding thereto being less than a predetermined second threshold, each of the control devices determines that the state of the communication cable corresponding thereto is abnormal.

4. The robot according to claim 2, wherein,
in response to the amount of light measured by the light amount measurement device corresponding thereto being less than a predetermined second threshold, each of the control devices determines that the state of the communication cable corresponding thereto is abnormal.

5. The robot according to claim 1, wherein
each of the control devices constitutes a node of a ring network communication system in which data is transmitted in one direction on a ring network formed in a ring shape, wherein
each of the nodes comprises:
a data generator, generating data to be sent to another node;
a data transmitter, having a data transmission block that transmits the data generated by the data generator of a local node as generation data, and a data relay block that transmits data sent from the another node as relay data to be relayed;
an output switching part, switching the data to be sent to the another node between the generation data transmitted by the data transmission block and the relay data transmitted by the data relay block, and outputting the data as transmission data; and
a data receiver, receiving the data sent from the another node as reception data, wherein
at least one of the data transmitter and the output switching part of each of the nodes comprises an error detector that detects abnormal data during data output on the fly, and,
in response to detection of the abnormal data by the error detector corresponding thereto, each of the nodes determines that a state of a source node of the abnormal data is abnormal, and, in response to presence of an abnormality in the amount of light measured by the light amount measurement device corresponding thereto, each of the nodes determines that the state of the communication cable corresponding thereto is abnormal.

6. The robot according to claim 2, wherein
each of the control devices constitutes a node of a ring network communication system in which data is transmitted in one direction on a ring network formed in a ring shape, wherein each of the nodes comprises:
  a data generator, generating data to be sent to another node;
  a data transmitter, having a data transmission block that transmits the data generated by the data generator of a local node as generation data, and a data relay block that transmits data sent from the another node as relay data to be relayed;
  an output switching part, switching the data to be sent to the another node between the generation data transmitted by the data transmission block and the relay data transmitted by the data relay block, and outputting the data as transmission data; and
  a data receiver, receiving the data sent from the another node as reception data, wherein
at least one of the data transmitter and the output switching part of each of the nodes comprises an error detector that detects abnormal data during data output on the fly, and,
in response to detection of the abnormal data by the error detector corresponding thereto, each of the nodes determines that a state of a source node of the abnormal data is abnormal, and, in response to presence of an abnormality in the amount of light measured by the light amount measurement device corresponding thereto, each of the nodes determines that the state of the communication cable corresponding thereto is abnormal.

7. The robot according to claim 3, wherein
each of the control devices constitutes a node of a ring network communication system in which data is transmitted in one direction on a ring network formed in a ring shape, wherein
each of the nodes comprises:
  a data generator, generating data to be sent to another node;
  a data transmitter, having a data transmission block that transmits the data generated by the data generator of a local node as generation data, and a data relay block that transmits data sent from the another node as relay data to be relayed;
  an output switching part, switching the data to be sent to the another node between the generation data transmitted by the data transmission block and the relay data transmitted by the data relay block, and outputting the data as transmission data; and
  a data receiver, receiving the data sent from the another node as reception data, wherein
at least one of the data transmitter and the output switching part of each of the nodes comprises an error detector that detects abnormal data during data output on the fly, and,
in response to detection of the abnormal data by the error detector corresponding thereto, each of the nodes determines that a state of a source node of the abnormal data is abnormal, and, in response to presence of an abnormality in the amount of light measured by the light amount measurement device corresponding thereto, each of the nodes determines that the state of the communication cable corresponding thereto is abnormal.

8. The robot according to claim 4, wherein
each of the control devices constitutes a node of a ring network communication system in which data is transmitted in one direction on a ring network formed in a ring shape, wherein
each of the nodes comprises:
  a data generator, generating data to be sent to another node;
  a data transmitter, having a data transmission block that transmits the data generated by the data generator of a local node as generation data, and a data relay block that transmits data sent from the another node as relay data to be relayed;
  an output switching part, switching the data to be sent to the another node between the generation data transmitted by the data transmission block and the relay data transmitted by the data relay block, and outputting the data as transmission data; and
  a data receiver, receiving the data sent from the another node as reception data, wherein
at least one of the data transmitter and the output switching part of each of the nodes comprises an error detector that detects abnormal data during data output on the fly, and,
in response to detection of the abnormal data by the error detector corresponding thereto, each of the nodes determines that a state of a source node of the abnormal data is abnormal, and, in response to presence of an abnormality in the amount of light measured by the light amount measurement device corresponding thereto, each of the nodes determines that the state of the communication cable corresponding thereto is abnormal.

9. The robot according to claim 5, wherein,
in response to detection of the abnormal data by the error detector corresponding thereto and determination that the state of the source node of the abnormal data is abnormal, each of the nodes sends data indicating the abnormality in the source node; and
at least one of the nodes is a host node that transmits a control command for the actuator corresponding thereto to the another node, and, in response to receipt of the data indicating the abnormality in the source node, the host node does not transmit the control command to the source node related thereto.

10. The robot according to claim 5, wherein,
in response to determination that the state of the communication cable corresponding thereto is abnormal based on the amount of light measured by the light amount measurement device corresponding thereto, each of the nodes sends data indicating the abnormality in the communication cable; and
at least one of the nodes is a host node that transmits a control command for the actuator corresponding thereto to the another node, and, in response to receipt of the data indicating the abnormality in the communication cable, the host node does not transmit the control command to the node related to the abnormality in the communication cable.

* * * * *